United States Patent
Xu et al.

(10) Patent No.: US 12,204,757 B1
(45) Date of Patent: Jan. 21, 2025

(54) STRONG ORDERED TRANSACTION FOR DMA TRANSFERS

(71) Applicant: Amazon Technologies, Inc., Seattle, WA (US)

(72) Inventors: Kun Xu, Austin, TX (US); Ron Diamant, Santa Clara, CA (US); Ilya Minkin, Los Altos, CA (US); Raymond S. Whiteside, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 13 days.

(21) Appl. No.: 18/067,514

(22) Filed: Dec. 16, 2022

(51) Int. Cl.
  *G06F 3/06* (2006.01)

(52) U.S. Cl.
  CPC .......... *G06F 3/0611* (2013.01); *G06F 3/0659* (2013.01); *G06F 3/0673* (2013.01)

(58) Field of Classification Search
  CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2003/0697; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048;
  (Continued)

(56) References Cited

U.S. PATENT DOCUMENTS 5,392,393 A * 2/1995 Deering ................ G06T 15/005
  345/506
5,459,845 A * 10/1995 Nguyen ................ G06F 9/3804
  712/E9.056

(Continued)

OTHER PUBLICATIONS

Defintion of "race condition"; Ben Lutkevich; TechTarget; Jun. 2021; retrieved from https://www.techtarget.com/searchstorage/definition/race-condition on May 10, 2024 (Year: 2021).*

(Continued)

*Primary Examiner* — Daniel C. Chappell
(74) *Attorney, Agent, or Firm* — Weaver Austin Villeneuve & Sampson LLP

(57) ABSTRACT

A technique for processing strong ordered transactions in a direct memory access engine may include retrieving a memory descriptor to perform a strong ordered transaction, and delaying the strong ordered transaction until pending write transactions associated with previous memory descriptors retrieved prior to the memory descriptor are complete. Subsequent transactions associated with memory descriptors following the memory descriptor are allowed to be issued while waiting for the pending write transactions to complete. Upon completion of the pending write transactions, the strong ordered transaction is performed.

20 Claims, 12 Drawing Sheets

(58) Field of Classification Search
CPC ............... G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | | |
|---|---|---|---|---|
| 5,740,409 | A * | 4/1998 | Deering | G06T 9/00 345/503 |
| 5,874,969 | A * | 2/1999 | Storm | G06T 1/20 345/506 |
| 5,893,165 | A * | 4/1999 | Ebrahim | G06F 13/1694 711/158 |
| 6,704,831 | B1 * | 3/2004 | Avery | G06F 13/404 710/310 |
| 7,287,099 | B1 * | 10/2007 | Powderly | G06F 13/385 463/16 |
| 9,134,910 | B2 * | 9/2015 | Thompson | G06F 3/0659 |
| 11,907,575 | B2 * | 2/2024 | Yoon | G06F 13/1673 |
| 2007/0169042 | A1 * | 7/2007 | Janczewski | G06F 8/45 717/149 |
| 2008/0140980 | A1 * | 6/2008 | Mei | G06F 12/0851 711/E12.047 |
| 2011/0219204 | A1 * | 9/2011 | Caspole | G06F 12/0253 711/170 |
| 2015/0006834 | A1 * | 1/2015 | Dulloor | G06F 3/0659 711/162 |
| 2015/0019792 | A1 * | 1/2015 | Swanson | G06F 9/54 711/102 |
| 2015/0281126 | A1 * | 10/2015 | Regula | H04L 67/55 709/212 |
| 2017/0083326 | A1 * | 3/2017 | Burger | G06F 9/30145 |
| 2017/0160929 | A1 * | 6/2017 | Ayandeh | G06F 3/061 |
| 2017/0286113 | A1 * | 10/2017 | Shanbhogue | G06F 9/30036 |
| 2017/0351516 | A1 * | 12/2017 | Mekkat | G06F 9/30181 |
| 2018/0074827 | A1 * | 3/2018 | Mekkat | G06F 9/3834 |
| 2020/0371970 | A1 * | 11/2020 | Chachad | G06F 13/1605 |
| 2021/0048991 | A1 * | 2/2021 | Tanner | G06F 17/153 |

OTHER PUBLICATIONS

S. Mitsuno et al., "A High-Performance Out-of-Order Soft Processor Without Register Renaming," 2020 30th International Conference on Field-Programmable Logic and Applications (FPL), Gothenburg, Sweden, 2020, pp. 73-78, doi: 10.1109/FPL50879.2020.00022. (Year: 2020).*

F. A. Endo et al., "Micro-architectural simulation of in-order and out-of-order ARM microprocessors with gem5," 2014 International Conference on Embedded Computer Systems: Architectures, Modeling, and Simulation, Agios Konstantinos, Greece, 2014, pp. 266-273, doi: 10.1109/SAMOS.2014.6893220. (Year: 2014).*

R. Ohlendorf et al., "Performance Evaluation of RISC-based SoC Platforms in Network Processing Applications," 2006 International Conference on Embedded Computer Systems: Architectures, Modeling and Simulation, Samos, Greece, 2006, pp. 152-159, 10.1109/ICSAMOS.2006.300822. (Year: 2006).*

S. Ma, Y. Guo, S. Chen, L. Huang and Z. Wang, "Improving the DRAM Access Efficiency for Matrix Multiplication on Multicore Accelerators," 2019 Design, Automation & Test in Europe Conference & Exhibition (DATE), Florence, Italy, 2019, pp. 1058-1063, doi: 10.23919/DATE.2019.8714915. (Year: 2019).*

* cited by examiner

Time = T1

| Write Transaction | Status |
|---|---|
| WrTxID 402-1 | 0 |
| WrTxID 402-2 | 0 |
| WrTxID 402-3 | 0 |
| WrTxID 402-4 | 0 |
| WrTxID 402-5 | 0 |
| WrTxID 402-6 | 0 |

= relaxed ordered write

= strong ordered write

0 = write pending

1 = write complete

Dependency Vector(s):

Time = T2

| Write Transaction | Status |
|---|---|
| WrTxID 402-1 | 0 |
| WrTxID 402-2 | 1 |
| WrTxID 402-3 | 1 |
| WrTxID 402-4 | 0 |
| WrTxID 402-5 | 1 |
| WrTxID 402-6 | 0 |
| WrTxID 402-7 | 0 |
| WrTxID 402-8 | 0 |

= relaxed ordered write

= strong ordered write

0 = write pending

1 = write complete

Dependency Vector(s):

| | | WrTxID 402-1 | WrTxID 402-2 | WrTxID 402-3 | WrTxID 402-4 | WrTxID 402-5 |
|---|---|---|---|---|---|---|
| DV(402-6): | WrTxID 402-6 | 0 | 1 | 1 | 0 | 1 |

Time = T3

| Write Transaction | Status |
|---|---|
| WrTxID 402-1 | 0 |
| WrTxID 402-2 | 1 |
| WrTxID 402-3 | 1 |
| WrTxID 402-4 | 0 |
| WrTxID 402-5 | 1 |
| WrTxID 402-6 | 0 |
| WrTxID 402-7 | 1 |
| WrTxID 402-8 | 0 |
| WrTxID 402-9 | 0 |

= relaxed ordered write

= strong ordered write

0 = write pending

1 = write complete

Dependency Vector(s):

DV(402-6):

| WrTxID 402-6 | WrTxID 402-1 | WrTxID 402-2 | WrTxID 402-3 | WrTxID 402-4 | WrTxID 402-5 |
|---|---|---|---|---|---|
|  | 0 | 1 | 1 | 0 | 1 |

DV(402-9):

| WrTxID 402-9 | WrTxID 402-1 | WrTxID 402-4 | WrTxID 402-6 | WrTxID 402-8 |
|---|---|---|---|---|
|  | 0 | 0 | 0 | 0 |

Time = T4

| Write Transaction | Status |
|---|---|
| WrTxID 402-1 | 1 |
| WrTxID 402-2 | 1 |
| WrTxID 402-3 | 1 |
| WrTxID 402-4 | 1 |
| WrTxID 402-5 | 1 |
| WrTxID 402-6 | 0 |
| WrTxID 402-7 | 1 |
| WrTxID 402-8 | 0 |
| WrTxID 402-9 | 0 |
| WrTxID 402-10 | 0 |

☐ = relaxed ordered write

▨ = strong ordered write

0 = write pending

1 = write complete

Dependency Vector(s):

DV(402-6):

| WrTxID 402-6 | WrTxID 402-1 | WrTxID 402-2 | WrTxID 402-3 | WrTxID 402-4 | WrTxID 402-5 |
|---|---|---|---|---|---|
| | 1 | 1 | 1 | 1 | 1 | all dependent transactions completed; issue strong order WrTxID 402-6

DV(402-9):

| WrTxID 402-9 | WrTxID 402-1 | WrTxID 402-4 | WrTxID 402-6 | WrTxID 402-8 |
|---|---|---|---|---|
| | 1 | 1 | 0 | 0 |

FIG. 4D

Time = T5

| Write Transaction | Status |
|---|---|
| WrTxID 402-1 | 1 |
| WrTxID 402-2 | 1 |
| WrTxID 402-3 | 1 |
| WrTxID 402-4 | 1 |
| WrTxID 402-5 | 1 |
| WrTxID 402-6 | 1 |
| WrTxID 402-7 | 1 |
| WrTxID 402-8 | 1 |
| WrTxID 402-9 | 0 |
| WrTxID 402-10 | 1 |
| WrTxID 402-11 | 0 |

= relaxed ordered write

= strong ordered write

0 = write pending

1 = write complete

Dependency Vector(s):

| | WrTxID 402-1 | WrTxID 402-4 | WrTxID 402-6 | WrTxID 402-8 |
|---|---|---|---|---|
| DV(402-9): WrTxID 402-9 | 1 | 1 | 1 | 1 | all dependent transactions completed;
issue strong order WrTxID 402-9

STRONG ORDERED TRANSACTION FOR DMA TRANSFERS

BACKGROUND

A computer system may include processors, accelerators, input/output (I/O) devices, internal memory devices, external memory devices, and other suitable components to communicate with one another via one or more interconnects. The computer system may also include direct memory access (DMA) engines to transfer data between different components of the computer system. DMA transfers can perform data transfer between components of the system without involving the host processor to improve memory access latency and free up the host processor to perform other tasks.

BRIEF DESCRIPTION OF THE DRAWINGS

Various embodiments in accordance with the present disclosure will be described with reference to the drawings, in which:

FIG. 4D illustrates a conceptual diagram of an example of a scoreboard to track progress of pending transactions at a fourth point in time;

DETAILED DESCRIPTION

Figure 1:
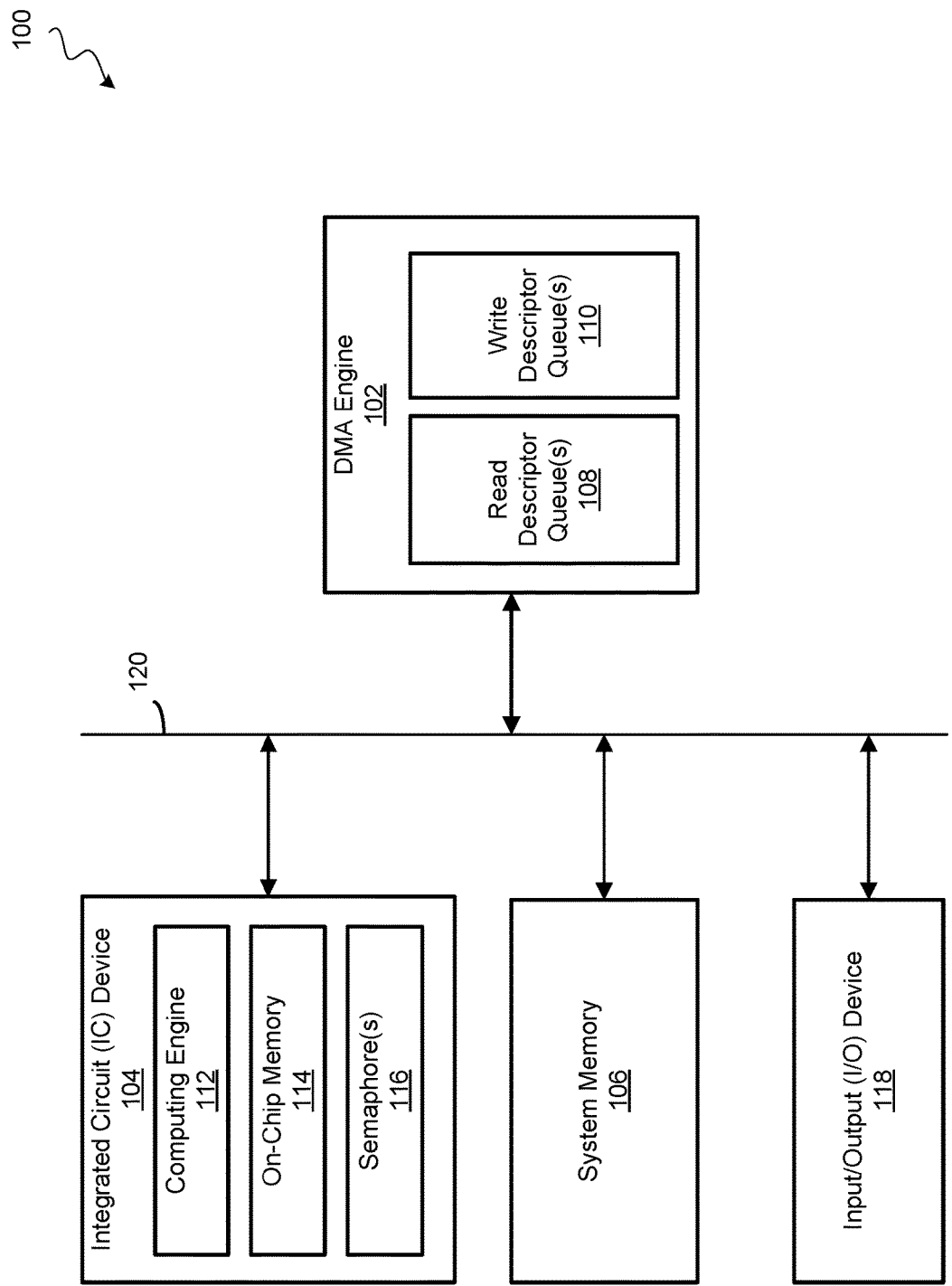
FIG. 1 illustrates a block diagram of an example of a computing system operable to perform data transfers using a direct memory access (DMA) engine.

In a computer system, direct memory access (DMA) engines can be used to offload data transfer operations from a host processor to improve system performance. In some implementations, the DMA engine may perform data transfer between different components of the computer system based on memory descriptors. Memory descriptors may include various parameters associated with the data transfer such as an address (e.g., source address for read, destination address for write) and a data transfer size. When transferring a set of data from a source component to a destination component, the DMA engine may read the set of data from the source component based on the read descriptors, temporarily store the set of data in a data buffer in the DMA engine, and then transfer the set of data from the data buffer to the destination component based on the write descriptors.

The DMA engine may include one or more queues. Each queue may include a descriptor queue pair having a read descriptor queue to store the read descriptors for reading the set of data from data sources, and a write descriptor queue to store the write descriptors for writing the set of data to target destinations. Each descriptor queue may operate as a FIFO and provide a stream of descriptors for the DMA engine to process. Descriptors placed in a descriptor queue are processed sequentially. Each queue pair (including the read descriptor queue and the write descriptor queue) can be thought of as a data movement thread. The number and types of DMA queues, data buffers, and the descriptors used for different read and write operations may vary based on the implementation.

In some implementations, data synchronization may be required between DMA transfers to avoid certain data hazards. For example, in some instances, a DMA write descriptor queue may perform a series of write transactions to write a set of data into a memory, and a component may perform a read transaction to read the same set of data from the memory (e.g., to perform computations on the set of data). In such instances, a Read-After-Write (RAW) hazard may occur if the set of data is read from the memory before the set of data has not been fully written into the memory. As an example, RAW hazard may occur in distributed deep learning systems, where a neural network is trained across multiple hardware nodes in parallel to reduce the overall training time. In such systems, different sets of data can be processed by each hardware node over multiple steps to perform data parallelism or model parallelism. Data synchronization may be required to ensure that each hardware node has the correct data to operate on for the next set of computations.

To avoid a RAW hazard, a read barrier can be implemented to maintain data coherency by ensuring that the read transaction is performed after the relevant write transactions are complete. One approach can be to insert a RAW barrier in the read descriptor queue so that the read transaction is not issued until relevant write transactions have finished. However, this approach can introduce a large gap in a single threaded DMA engine since subsequent read transactions that are not reading the same set of data will still have to wait until the write transactions are completed. Thus, this approach can cause big throughput gaps due to long round trip latency for read transactions.

Another approach can be to insert a Write-After-Write (WAW) barrier so that a subsequent write transaction does not happen until the previous write transactions have finished. The subsequent write can be a control write such as a semaphore write. For example, to maintain data coherency, a semaphore can be updated following a series of write transactions to indicate the completion of the write transactions. The consumer of the data being written by the write transactions can monitor the semaphore to determine when the data is ready. This approach can provide better throughput since read transactions are not stalled and can go through while the DMA engine is waiting for the previous write transactions to complete. However, this approach can cause head-of-line (HOL) blocking in the single threaded DMA engine since the write transactions following the control write transaction cannot start, even though they are unrelated to the previous write transactions.

The techniques described herein can be used to maintain data coherency without stalling unrelated memory transactions by marking a transaction as a strong ordered transaction. The memory descriptor for the transaction can be tagged with an indication of being strong ordered (SO) by using an available bit in the memory descriptor. When the DMA engine processes a transaction that is tagged as an SO transaction, the DMA engine can track any pending write transactions, and may delay performing the SO transaction until all the pending write transactions that the SO transaction is dependent on have finished. The SO transaction can be a write transaction, or a read transaction. In the meantime, the DMA engine may allow subsequent transactions, which are not SO transactions, to be processed without impacting subsequent DMA transfer throughput. Hence, data coherency can be maintained using an available bit in the memory descriptor as an indication for a strong ordered transaction. This allows strong ordering of transactions to be respected without impacting subsequent DMA transfer throughput.

In some scenarios, another SO transaction can be processed by the DMA engine while a previous SO write transaction is still waiting for completion of the pending write transactions. In this case, the DMA engine may also delay performing this latter SO transaction until all pending write transactions including the previous SO write transaction are complete. Thus, it is possible to have nested SO transactions, and each SO transaction will have a respective set of pending write transactions that the SO transaction waits for.

In some implementations, a scoreboard can be maintained by the DMA engine to indicate progress of each pending write transaction that a given SO transaction is dependent on for completion. The scoreboard may include a dependency vector for each SO transaction. The dependency vector reflects which write transactions a particular SO transaction is waiting on. Generally, pending write transactions that came before the SO transaction are included in the dependency vector. The DMA engine may delay the SO transaction until all the pending write transactions of the corresponding dependency vector are complete. A write transaction can be marked as complete in the scoreboard when an acknowledgement is received in response to the write transaction.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an example of a computing system 100 operable to perform data transfers using a direct memory access (DMA) engine 102. Computing system 100 may include various components that communicate with the DMA engine 102, including an integrated circuit (IC) device 104, a system memory 106, and an input/output (I/O) device 118. Computing system 100 may also include other components based on the functionalities supported by the system. For example, computing system 100 may also include a host processor to execute software to configure and manage different components. In various implementations, different components of the system may communicate with one another via one or more interconnects 120 based on any suitable bus protocol (e.g., Peripheral Component Interconnect Express (PCIe), etc.). In some examples, computing system 100 can be used for machine learning applications to provide services including image recognition, natural language processing, video processing, computer vision, or text-based queries, among other examples.

System memory 106 can be used to store data for IC device 104. System memory 106 can be implemented using dynamic random-access memory (DRAM), flash memory, or other types of memory device. In some implementations, system memory 106 can include high bandwidth memory (HBM), which may include vertically stacked DRAM chips. I/O device 118 can be a network device, a storage device, or other types of communication device that can receive or provide data for the IC device 104.

IC device 104 may include a computing engine 112, an on-chip memory 114, and one or more semaphores 116. In some examples, computing engine 112 can perform computations on input data stored in the on-chip memory 114, and may write the results of the computations back to the on-chip memory 114. On-chip memory 114 can be implemented using synchronous random-access memory (SRAM), or other type of suitable memories. On-chip memory 114 may have a smaller capacity as compared to system memory 106. The input data stored in on-chip memory 114 that computing engine 112 operates on can be provided from system memory 106, I/O device 118, or may include intermediate data previously computed by the computing engine 112. As an example, computing engine 112 may include a neural network processor, which can be one of multiple processing nodes in a distributed deep learning system that is used to train a neural network model to perform a certain task. In some examples, the input data may be part of a training dataset on which forward propagation may be performed, and a loss function can be used to fine tune the weights using backward propagation in the distributed training environment.

In some examples, on-chip memory 114 can also be used to store weight values and/or intermediate data (e.g., gradients) associated with the training process.

In some implementations, semaphores 116 can be used to synchronize various data transfer operations performed by the DMA engine 102. Semaphores 116 may include one or more semaphores, and each semaphore can be implemented using a register (e.g., flip-flops) or other suitable storage. Each semaphore can act as an event register. During execution of a program, computing engine 112 may wait for a certain value to be stored in a semaphore 116 to perform a specific action. For example, computing engine 112 may wait for a semaphore 116 to reach a specific value before reading the set of data from the on-chip memory 114. Semaphore 116 can be updated to that specific value by the DMA engine 102 when the last write transaction has been performed and the set of data is available in the on-chip memory 114.

DMA engine 102 can be used to perform data transfers between on-chip memory 114, system memory 106, and I/O device 118. In some instances, the set of data stored in the on-chip memory 114 may have to be transferred to the system memory 106 to make room for a new set of data, or to the I/O device 118 to be transferred to another processing node. In some instances, computing engine 112 may use or operate on data that is stored in system memory 106, and thus the data may have to be transferred from system memory 106 to the on-chip memory 114. In some instances, data used by computing engine 112 can come from another processing node, and the data can be received via I/O device 118 to be stored into the on-chip memory 114 for further computations by the computing engine 112. By way of example, the data can be associated with different training steps that are performed to train a neural network model.

DMA engine 102 can be used to perform the data transfers using one or more write descriptor queues 110 and one or more read descriptor queues 108. Write descriptor queue 110 may store write descriptors for performing write operations, and read descriptor queue 108 may store read descriptors for performing read operations. The write descriptors and/or read descriptors may generally be referred to as memory descriptors. Write descriptor queue 110 may store write descriptors for writing a set of data into on-chip memory 114, and read descriptor queue 108 may store read descriptors for reading a set of data from on-chip memory 114. In some implementations, the DMA engine 102 may include multiple pairs of read and write descriptor queues. Each pair containing a write descriptor queue and a read descriptor queue may operate as a single-threaded engine. The DMA engine 102 may execute the read and write instructions of a queue pair to perform the data transfers in sequence.

In some implementations, a write descriptor queue 110 may store write descriptors corresponding to the write transactions to write data into on-chip memory 114 for computing engine 112 followed by a write descriptor to update a semaphore to indicate to computing engine 112 that the data is ready. However, in some cases, a Write-After-Write (WAW) hazard may occur when the semaphore update transaction is performed before the previous write transactions have completed. In some implementations, a WAW barrier can be inserted with the semaphore update transaction to ensure that semaphore 116 is updated only after the write transactions have been completed. However, this approach can cause head-of-line (HOL) blocking in the single threaded DMA engine because the write transactions following the semaphore write transaction cannot start even if those write transactions are unrelated to the outstanding write transactions and may be writing to addresses that are independent of the previous write transactions.

In some instances, a Read-After-Write (RAW) hazard may occur when a write descriptor queue 110 of one queue pair writes a set of data that is read by a read descriptor in a read descriptor queue 108 of a different queue pair. As an example, a write descriptor queue 110 may write a set of data received from I/O device 118 into system memory 106. A read descriptor queue 108 may read the set of data to copy the data from system memory into on-chip memory 114. In order to avoid a RAW hazard, DMA engine 102 has to ensure that the write transaction has completed (e.g., the data has been written into system memory 106) before the read transaction is issued so that the correct data is available to be read by the read descriptor queue 108. In some implementations, a RAW barrier can be inserted before the read transaction to avoid the RAW hazard, e.g., the read transaction cannot be performed until the write transaction has been completed. However, this approach may introduce a large throughput gap, because subsequent read transactions in the read descriptor queue 108 for reading unrelated data may nor start until the write transactions have been completed.

Techniques described herein can be used to maintain data coherency by marking a transaction as a strong ordered (SO) transaction. A SO transaction is a transaction that respects the ordering of transactions. For example, the SO transaction can be executed once all the previous write transactions that this SO transaction is dependent upon have finished. However, subsequent write or read transactions that are not SO transactions can be allowed to be processed while waiting for the pending write transactions to complete. In some embodiments, one of the available bits in the memory descriptor can be used to mark a transaction as an SO transaction. This is further described with reference to FIG. 2.

Figure 2:
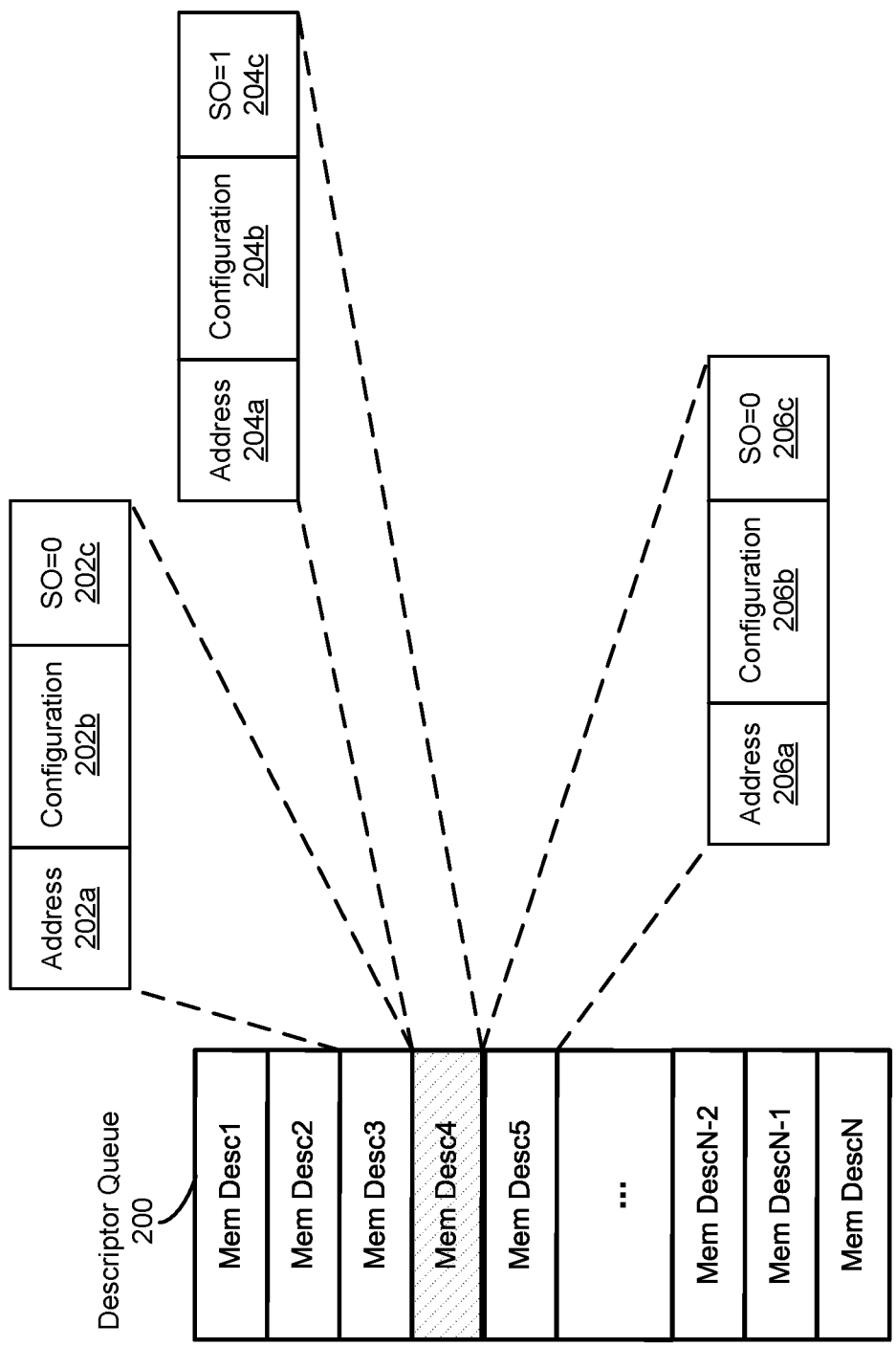
FIG. 2 illustrates a block diagram of an example of a descriptor queue storing memory descriptors for DMA transfers.

FIG. 2 illustrates an example of a descriptor queue 200. Descriptor queue 200 may store memory descriptors for DMA transfers, and can be an example of a write descriptor queue 110 or a read descriptor queue 108. Descriptor queue 200 can be programmed with N memory (mem) descriptors including a mem desc1, a mem desc2, a mem desc3, a mem desc4, a mem desc5, . . . , a mem descN-2, a mem descN-1, and a mem descN which can be used to perform write or read transactions by DMA engine 102. Each of the N mem descriptors may include an address field, one or more configuration fields, and a SO indicator bit for a transaction. The address field may correspond to a source address for a read transaction, or a destination address for a write transaction. The configuration field may include attributes associated with the transaction, e.g., number of data elements to be transferred, size of each data element, a data transfer type, etc. The SO indicator bit can be used to indicate whether the transaction is strong ordered. For example, a transaction is strong ordered when the SO indicator bit is enabled (e.g., equal to "1"); and a transaction is relaxed ordered (not strong ordered) when the SO indicator bit is disabled (e.g., equal to "0"). A strong ordered transaction may have to wait until previous transactions (e.g., previous write transactions) are complete before being executed, whereas a relaxed ordered transaction can be executed without waiting for other transactions to finish. In some implementations, software such as a runtime driver can determine whether to set the SO indicator bit for a transaction. For example, the SO indicator bit can be asserted when performing a control write (e.g., to update a semaphore) during program execution.

As shown in FIG. 2, mem desc3 may include an address 202a, a configuration 202b, and an SO indicator bit 202c that is disabled (e.g., set to "0"), mem desc4 may include an address 204a, a configuration 204b, and an SO indicator bit 204c that is enabled (e.g., set to "1"), and mem desc5 may include an address 206a, a configuration 206b, and an SO indicator bit 206c that is disabled (e.g., set to "0"). Note that other memory descriptors in descriptor queue 200 may include similar attributes that are not shown in FIG. 2 for ease of illustration. In some examples, the N mem descriptors may include some memory descriptors that are for transactions not related to one another. As an example, mem desc1, mem desc2, and mem desc3 may correspond to write transactions for writing a set of data into an address range associated with on-chip memory 114 for computing engine 112 to operate on, and mem desc5 to mem descN may correspond to write transactions for writing an unrelated set of data into a different address range.

The SO indicator 204c in descriptor mem desc4 being enabled indicates an SO transaction that is not performed until the SO requirement is met (e.g., that all the outstanding write transactions received prior to the SO transaction have been completed). Similarly, SO indicators 202c and 206c in respective descriptors mem desc3 and mem desc5 being disabled indicate relaxed order transactions that can be processed by the DMA engine 102 without waiting for any pending transactions to complete. Thus, execution of the SO transaction associated with mem desc4 is delayed until all the pending write transactions that came before descriptor mem desc4 are complete. This may include write transactions associated with previous descriptors mem desc1, mem desc2, and mem desc3, as well as write transactions pending in other descriptor queues of the DMA engine 102. While waiting for the pending write transactions to complete, processing of subsequent memory descriptors following descriptor mem descr4 (e.g., descriptor mem descr5 and so on) is allowed to proceed. Once the pending write transactions are complete, the SO transaction can be performed to avoid a data hazard. Thus, strong ordering of a transaction can be respected without impacting the transfer throughput of the DMA engine 102 for subsequent transactions.

In some examples, SO transaction corresponding to descriptor mem desc4 can be a semaphore update transaction that is performed to indicate that the write transactions corresponding to the descriptors mem desc1, mem desc2, and mem desc3 have completed and the data associated with those write transactions is available for use. For example, the write transactions may be performed to write data in the on-chip memory 114 which can be used by computing engine 112 for subsequent computations.

In some implementations, a scoreboard can be maintained for each SO transaction to keep track of all the pending transactions that the SO transaction is dependent upon. DMA engine 102 can update the scoreboard as each pending transaction for an SO transaction is completed (e.g., when an acknowledgement for a pending transaction is received). Once the scoreboard indicates that there are no pending transactions for the particular SO transaction, the SO transaction can be performed. The scoreboard can be represented using vectors, arrays, or other suitable data structure.

In some examples, another SO transaction can be received while SO transaction corresponding to descriptor mem desc4 is pending. For example, descriptor mem descN-1 may include an enabled SO indicator bit (e.g., set to "1"). In this case, a transaction corresponding to descriptor mem descN-1 may also be delayed until all the pending write transactions prior to the descriptor mem descN-1 are complete. For example, this may include write transactions associated with previous descriptors mem desc1 to mem descN-2, as well as mem desc4. Once the SO transaction corresponding to descriptor mem desc4 is performed after completion of the write transactions associated with previous descriptors mem desc1, mem desc2, and mem desc3, the transaction corresponding to descriptor mem descN-1 may still be delayed as it waits for the transactions corresponding to descriptors mem desc5, . . . , mem descN-2 to complete. Meanwhile, a relaxed order transaction corresponding to descriptor mem descN can be processed, without impacting the transfer throughput of the DMA engine 102.

Although certain aspects have been described with the SO transaction corresponding to descriptor mem desc4 as a SO write transaction, strong ordering can also be applied to a SO read transaction corresponding to a read descriptor in a read descriptor queue. Similar to a SO write transaction, a SO read transaction may wait until prior pending write transactions have finished before being executed. Subsequent read transactions that are relaxed order can be processed while waiting for the pending write transactions to finish.

Figure 3:
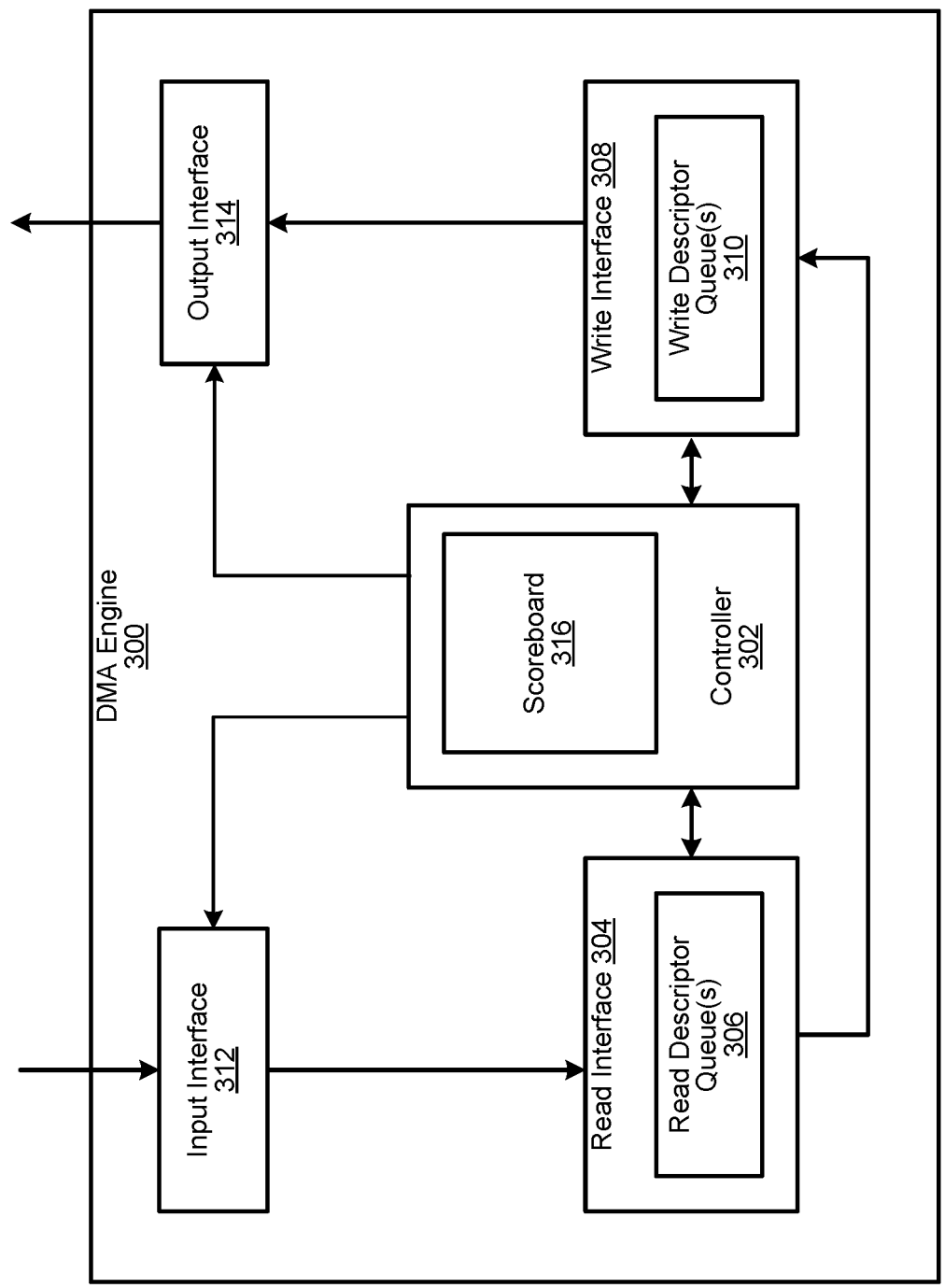
FIG. 3 illustrates a block diagram of an example of a DMA engine.

FIG. 3 illustrates a block diagram of an example of a DMA engine 300. DMA engine 300 can be an integrated circuit device that is operable to perform data transfers in a computing system or between computing systems. In some implementations, DMA engine 300 can be an example of DMA engine 102.

DMA engine 300 may include a controller 302, a read interface 304, a write interface 308, an input interface 312, and an output interface 314. Read interface 304 may include one or more read descriptor queues 306, and write interface 308 may include one or more write descriptor queues 310. Read descriptor queue 306 can be an example of the read descriptor queue 108, and write descriptor queue 310 can be an example of the write descriptor queue 110.

In some embodiments, read descriptor queue 306 and write descriptor queue 310 can be examples of the descriptor queue 200. DMA engine 300 may include additional components to facilitate the data transfer that are not described with reference to FIG. 3. For example, DMA engine 300 may also include configuration registers that can be programmed by the host processor to configure different components of the DMA engine 300. DMA engine 300 may also include data buffers to temporarily store the data being transferred from a source to a destination.

Input interface 312 and output interface 314 may include suitable interfaces to communicate with the IC device 104, system memory 106, I/O device 118, and/or other components of the system 100 via one or more interconnects (e.g., interconnect 120). For example, DMA engine 300 may read a set of data using the input interface 312 that can be stored in a data buffer (not shown) by the read interface 304. Write interface 308 can obtain the set of data from the data buffer, and provide the set of data to output interface 314 for writing to a destination. In various examples, the set of data can be transferred between on-chip memory 114, system memory 106, and I/O device 118 using the input interface 312 and the output interface 314.

Controller 302 is operable to manage the operations of DMA engine 300. For example, controller 302 may maintain head and tail pointers for read/write descriptor queues of DMA engine 300. Controller 302 may monitor the number of available entries in a descriptor queue to prevent queue overflow. In some implementations, controller 302 may also maintain completion statuses and generate interrupts for components of the computing system 100. Controller 302 may process the memory descriptors in read descriptor queue 306 by reading data from the source designated in the memory descriptor via input interface 312, and process the memory descriptors in write descriptor queue 308 by writing the data to a target destination designated in the memory descriptor via output interface 314. As such, input interface 312 may issue read operations to obtain the data being transferred, and output interface 314 may issue write operations to place the data into the target destination.

In some examples, read descriptor queue 306 and/or write descriptor queue 308 may receive one or more descriptors to perform corresponding one or more SO transactions. Controller 302 may identify an SO transaction based on the SO indicator bit in the corresponding mem descriptor being enabled (e.g., set to "1"). Controller 302 may be operable to delay each SO transaction until completion of all the pending write transactions associated with previous memory descriptors prior to the memory descriptor corresponding to the SO transaction. In some embodiments, controller 302 may maintain a scoreboard 316 to track progress of pending write transactions for each SO transaction. In some implementations, controller 302 and the scoreboard 316 can be part of the same integrated circuit device. An example scoreboard is described with reference to FIG. 4.

FIGS. 4A-4E illustrate a series of snapshots over time of a conceptual diagram of an example of a scoreboard 400. Scoreboard 400 can be an example of the scoreboard 316 in FIG. 3. Scoreboard 400 can be used, for example, by controller 302 of the DMA engine 300 to track progress of pending transactions. Controller 302 may communicate with the output interface 314 to delay a SO write transaction (or input interface 312 to delay a SO read transaction) based on the corresponding dependency vector provided by the scoreboard 400 until all the pending write transactions associated with that SO transaction are complete. In some implementations, the SO indicator bit from the corresponding memory descriptor can be used by the output interface 314 to block a SO write transaction (or input interface 312 to block a SO read transaction) until the corresponding dependency vector indicates the pending write transactions have finished.

Scoreboard 400 may include a dependency vector for each SO transaction being processed by the DMA engine. When a memory descriptor having an enabled SO indicator bit is processed, a dependency vector can be generated for the SO transaction. The dependency vector may include a completion status for each write transaction that is pending at the time the memory descriptor for the SO transaction is processed. When a write transaction is complete (e.g., when an acknowledgement is received by the DMA engine from the target of write transaction), the completion status in scoreboard 400 can be asserted. A SO transaction is performed when all of the completion statuses corresponding to the SO transaction have been asserted.

Figure 4A:
FIG. 4A illustrates a conceptual diagram of an example of a scoreboard to track progress of pending transactions at a first point in time.
Figure 4A:
Figure 4A:
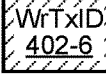

Referring to FIG. 4A, scoreboard 400 can track the progress of write transactions using write transaction identifiers. Although scoreboard 400 is shown as using write transaction identifiers, any suitable identifier can be used to identify a write transaction. In some implementations, the write transactions being tracked may include write transactions from multiple queues of the DMA engine, and thus the write transaction identifier may include a queue identifier to indicate which write descriptor queue the write transaction belongs to.

At a first point in time T1, there can be five write transactions having respective write transaction identifiers 402-1 to 402-5 pending when the memory descriptor associated with SO write transaction 402-6 is processed. As such, scoreboard 400 can track the progress of these write transactions. To differentiate between SO transactions and relaxed ordered transactions, the SO transactions are shown with a diagonal fill pattern. A status of "0" means that the write transaction is pending, and a status of "1" means that the write transaction is complete (e.g., an acknowledgement for the write transaction has been received from the target).

At time T1, each of the write transactions 402-1 to 402-6 have a status of "0" because none of these transactions are complete. Because SO write transaction 402-6 is a strong ordered transaction, a dependency vector DV (402-6) is initialized for this transactions. As shown in FIG. 4A, dependency vector DV (402-6) includes write transactions 402-1, 402-2, 402-3, 402-4, and 402-5, because these write transactions are pending at time T1 when the memory descriptor for SO write transaction 402-6 is processed. Issuance of the SO write transaction 402-6 is delayed until the write transactions in dependency vector DV (402-6) are complete.

Figure 4B:
FIG. 4B illustrates a conceptual diagram of an example of a scoreboard to track progress of pending transactions at a second point in time.
Figure 4B:

Referring to FIG. 4B, at a later point in time T2, the write transactions 402-2, 402-3, and 402-5 have been completed (e.g., acknowledgement has been received for these transactions). As such, the statuses of these transactions are updated to indicate that they are complete (e.g., status set to "1"). It should be noted the write transactions can be completed out of order (as compared to the order in which they were issued). This can be due to various factors such as the respective target components being busy, interconnect congestion, propagation delay, etc. Referring to dependency vector DV (402-6), the statuses of dependent write transactions 402-2, 402-3, and 402-5 have been updated as complete. However, because dependent write transactions 402-1 and 402-4 are still pending, the DMA engine does not issue SO write transaction 402-6 at this time. Meanwhile, new write transactions 402-7 and 402-8 are being processed. As such, these write transaction have been added to scoreboard 400 with a status of "0."

Figure 4C:
FIG. 4C illustrates a conceptual diagram of an example of a scoreboard to track progress of pending transactions at a third point in time.
Figure 4C:
Figure 4C:
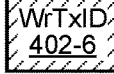
Figure 4C:
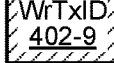

Referring to FIG. 4C, at another later point in time T3, the write transaction 402-7 has been completed (e.g., acknowledgement has been received for these transactions). As such, the status of write transaction 402-7 has been updated to indicate that it is complete (e.g., status set to "1"). It should be noted that although SO write transaction 402-6 is still pending, issuance of write transaction 402-7 is allowed to proceed, and write transaction 402-7 is completed before SO write transaction 402-6 is issued. Hence, despite encountering a strong ordered transaction, the DMA engine can continue to process subsequent descriptors and transfer data for subsequent transactions.

Meanwhile, the memory descriptor for a new SO write transaction 402-9 is processed. Because SO write transaction 402-9 is a strong ordered transaction, a dependency vector DV (402-9) is initialized for this transactions. As shown in FIG. 4C, dependency vector DV (402-9) includes write transactions 402-1, 402-4, 402-6, 402-4, and 402-8, because these write transactions are pending at time T3 when the memory descriptor for SO write transaction 402-9 is processed. Issuance of the SO write transaction 402-9 is delayed until the write transactions in dependency vector DV (402-9) are complete. It should be noted that in the example shown, SO write transaction 402-9 is dependent on another SO write transaction 402-6.

Referring to FIG. 4D, at a further point in time T4, the write transactions 402-1 and 402-4 have been completed (e.g., acknowledgement has been received for these transactions). As such, the statuses of these transactions are updated to indicate that they are complete (e.g., status set to "1"). Referring to dependency vector DV (402-6), the statuses of dependent write transactions 402-1 and 402-4 have also been updated as complete. At this time, because all dependent write transactions 402-1 to 402-5 in dependency vector DV (402-6) are complete, the DMA engine can issue the SO write transaction 402-6. The statuses of dependent write transactions 402-1 and 402-4 in dependency vector DV (402-9) have also been updated as complete. However, because dependent write transactions 402-6 and 402-8 are still pending, the DMA engine does not issue SO write transaction 402-9 at this time. Although SO write transition 402-6 has been issued, the status of write transactions 402-6 is still pending, because an acknowledgement for this transaction has not yet been received. Meanwhile, a new write transactions 402-10 is being processed, and has been added to scoreboard 400 with a status of "0".

Figure 4E:
FIG. 4E illustrates a conceptual diagram of an example of a scoreboard to track progress of pending transactions at a fifth point in time.
Figure 4E:

Referring to FIG. 4E, at a subsequent point in time T5, the write transactions 402-6, 402-8, and 402-10 have been completed (e.g., acknowledgement has been received for these transactions). As such, the statuses of these transactions are updated to indicate that they are complete (e.g., status set to "1"). Even though processing of write transaction 402-10 was initiated after SO write transition 402-6, because write transaction 402-10 is allowed to proceed while waiting for SO write transition 402-6, write transaction 402-10 can finish before SO write transition 402-6 is even issued. Referring to dependency vector DV (402-9), the statuses of dependent write transactions 402-6 and 402-8 have also been updated as complete. At this time, because all dependent write transactions 402-1, 402-4, 402-6, and 402-8 in dependency vector DV (402-6) are complete, the DMA engine can issue the SO write transaction 402-9.

When a SO transaction is allowed to proceed and the transaction is performed by the DMA engine (e.g., dependency vector has all completion statuses asserted), the dependency vector of the SO transaction can be removed from scoreboard 400. When a completed write transaction no longer has any outstanding SO transaction that depends on the write transaction, the completion status of the completed write transaction can be removed from scoreboard 400 because it is no longer necessary to track the completed write transaction. It should be noted that while the SO transactions such as transaction 402-6 and 402-9 are waiting to be performed, the DMA engine continues to process memory descriptors that follow these transactions. Any relax ordered transaction can proceed before the SO transaction is performed. It should also be noted that a strong order read transaction can be processed in a similar manner. For example, when a SO read transaction is encountered, a dependency vector can be initialized in the scoreboard, and the SO reach transaction is issued when all dependent transactions in the dependency vector are complete.

Figure 5:
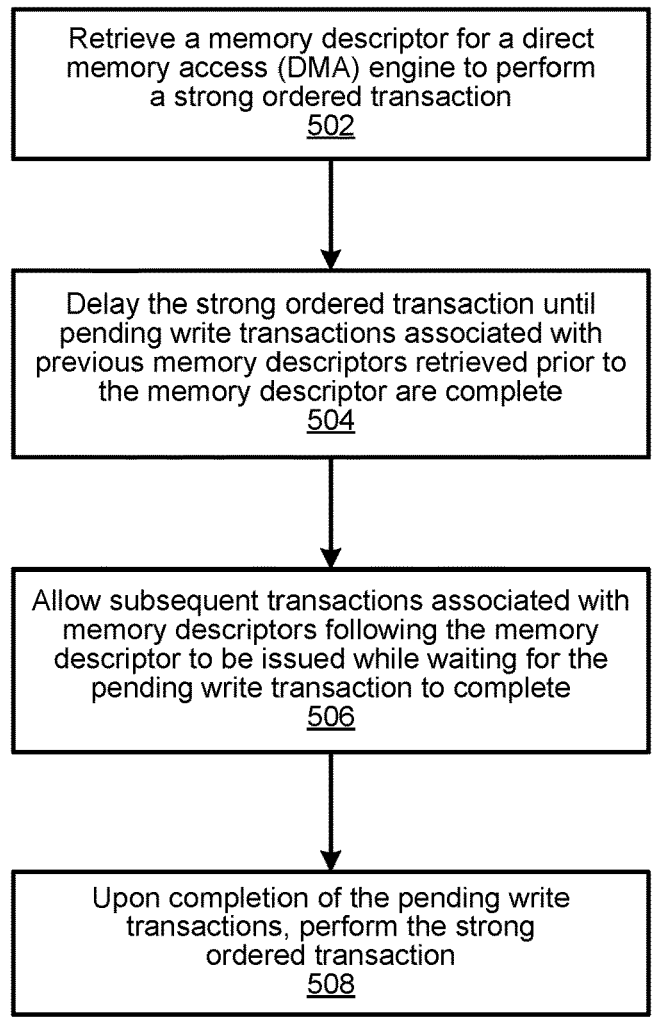
FIG. 5 illustrates a flow diagram of an example of a process for performing DMA transfers.

FIG. 5 illustrates a flow diagram of an example of a process 500 executable by a DMA engine to process strong ordered transactions. The DMA engine can be, for example, DMA engine 102 or the DMA engine 300. Process 500 can also be performed by other suitable integrated circuit devices capable of facilitating data transfers between components of a computing system.

Process 500 may begin at block 502 by retrieving a memory descriptor for a DMA engine to perform a strong ordered transaction. For example, the memory descriptor can be retrieved from a write descriptor queue if the strong ordered transaction is a strong ordered write transaction, or the memory descriptor can be retrieved from a read descriptor queue if the strong ordered transaction is a strong ordered read transaction. The memory descriptor may include a field to store a strong ordered (SO) indicator bit, and the strong ordered indicator bit can be enabled or asserted to indicate that the memory descriptor is for a strong ordered transaction. In other implementations, a memory descriptor can use a different type of indicator to signal that a transaction is a strong ordered transaction.

At block 504, process 500 may delay the strong ordered transaction until pending write transactions associated with previous memory descriptors retrieved prior to the memory descriptor are complete. For example, the DMA engine can put a temporary hold on the strong ordered transaction to prevent the strong ordered transaction from proceeding. In some implementations, the strong ordered transaction can be held at the output interface (if write transaction) or at the input interface (if read transaction) of the DMA engine.

A scoreboard can be maintained to track progress of each pending write transaction that the strong ordered transaction is dependent on. For example, when the memory descriptor is processed and is determined to be for a strong order transaction (e.g., by checking the SO indicator bit), a dependency vector for the memory descriptor can be generated and tracked by the scoreboard. The dependency vector may include a completion status for each of the pending write transactions associated with prior memory descriptors that were retrieved before the memory descriptor of block 502. The pending write transactions may include write transactions from multiple write descriptor queues in the DMA engine.

At block 506, process 500 may allow subsequent memory descriptors following the memory descriptor to be processed while waiting for the pending write transactions to complete. Hence, subsequent transactions associated with these subsequent memory descriptors are allowed to be issued while waiting for the pending write transactions to complete. For example, the DMA engine may continue processing memory descriptors from the same descriptor queue as the strong ordered transaction. In other words, even though the strong ordered transaction is being delayed, processing of subsequent memory descriptors is allowed to continue. For subsequent memory descriptors that are for relax ordered transactions, it may be possible for the transaction to complete before the strong ordered transaction of block 502 is performed. This can prevent degradation of the throughput of the DMA engine caused by the strong ordered transaction because data transfers can still proceed while waiting on the strong ordered transaction to be performed.

At block 508, process 500 may perform the strong ordered transaction upon completion of the pending write transactions. A pending transaction can be considered complete when an acknowledgement is received in response to the pending write transaction. When the DMA engine receives an acknowledgement for a pending write transaction (e.g., as identified by a transaction identifier in the acknowledgement), the completion status for the write transaction in the scoreboard can be asserted to indicate that the write transaction is finished. When all completion statuses in the dependency vector of a strong ordered transaction have been asserted, the strong ordered transaction can be released onto the output interface (if write transaction) or onto the input interface (if read transaction) to execute the transaction. Execution of the strong ordered transaction is permitted at this point because the write transactions that the strong ordered transaction depends on have finished.

In some scenarios, the strong ordered transaction can be a semaphore write transaction. For example, the strong ordered transaction can follow a series of write transactions to write a first set of data into an on-chip buffer memory for a compute engine (e.g., a state buffer for a neural network processor). A series of memory descriptors to write the first set of data can appear in a write descriptor queue before the memory descriptor of the strong ordered transaction. As the memory descriptors in the queue are processed sequentially, while some of the first set of data is still being written, the memory descriptor of the strong ordered write transaction can be retrieved and processed. The strong ordered write transaction can be a write to a semaphore to update the semaphore to a target value.

Based on the strong ordered indicator bit being enabled in the memory descriptor, the strong ordered write transaction to update the semaphore can be delayed until the first set of data has been completely written into the on-chip buffer memory. While the write transactions associated with the first set of data are still in flight and the strong ordered semaphore write transaction is pending, the DMA engine can continue processing other memory descriptors for other transactions (e.g., to write a second set of data). Upon completion of writing the first set of data, the strong ordered write transaction to update the semaphore can be performed. It should be noted that it is possible for some of the second set of data to be written before the semaphore is updated. Thus, the strong ordered semaphore update does not stall the DMA engine, and other unrelated (relax ordered) transactions can still proceed while the strong ordered semaphore update transaction is waiting to be performed.

The compute engine can monitor the semaphore, and when the semaphore reaches the target value, the compute engine can proceed with reading the set of data from the on-chip buffer memory. In some implementations, an interrupt can be triggered when the semaphore reaches the target value to indicate to the compute engine that the set of data is ready for reading from the on-chip buffer memory.

In some scenarios, am additional memory descriptor retrieved while the strong ordered write transaction is still pending can be for another strong ordered transaction (e.g., as indicated by SO indicator bit in the memory descriptor). In such scenarios, this additional strong ordered transaction can be delayed until each of the write transactions pending before this memory descriptor are complete. The pending write transactions can include the prior strong ordered transaction. A dependency vector for this latter strong ordered transaction can be generated, and the completion statuses of the pending write transactions (including the prior strong ordered transaction) can be tracked in the scoreboard. While the latter strong ordered transaction is waiting to be performed (e.g., waiting for each write transactions including the prior strong ordered write transaction to complete), memory descriptors following this latter memory descriptor are allowed to be processed. Thus, it is possible to have nested strong ordered transactions while still maintaining the throughput of the DMA engine.

Figure 6:
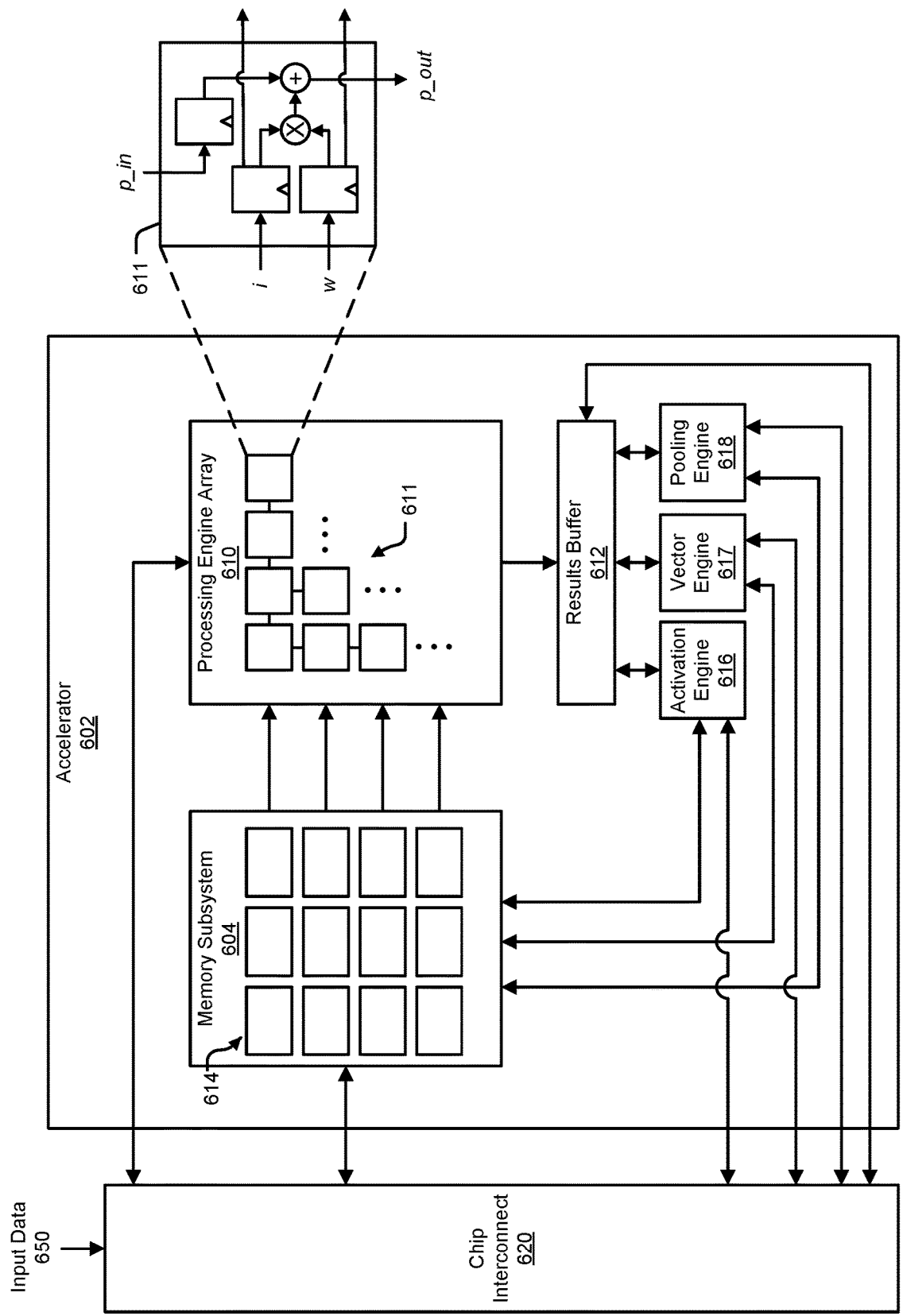
FIG. 6 illustrates a block diagram of an example of an integrated circuit device.

FIG. 6 is a block diagram illustrating an example of an accelerator 602. In various examples, the accelerator 602, for a set of input data (e.g., input data 650), can execute computations using a processing engine array 610, an activation engine 616, a vector engine 617, and/or a pooling engine 618. In some examples, the example accelerator 602 may be an integrated circuit component of a processor, such as a neural network processor. The processor may have other integrated circuit components, including additional accelerator engines.

In various implementations, the memory subsystem 604 can include multiple memory banks 614. Memory subsystem 604 can also be referred to as a state buffer, and data can be written into state buffer or be copied from the state buffer using a DMA engine (e.g., DMA engine 100 or 300). In some implementations, each memory bank 614 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 614. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 604 can permit simultaneous access to the read or write channels of multiple memory banks. As another example, the memory subsystem 604 can include arbitration logic such that arbitration between, for example, the outputs of multiple memory banks 614 can result in more than one memory bank's output being used. In these and other examples, though globally managed by the memory subsystem 604, each memory bank can be operated independently of any other.

Having the memory banks 614 be independently accessible can increase the efficiency of the accelerator 602. For example, values can be simultaneously read and provided to each row of the processing engine array 610, so that the entire processing engine array 610 can be in use in one clock cycle. As another example, the memory banks 614 can be read at the same time that results computed by the processing engine array 610 are written to the memory subsystem 604. In contrast, a single memory may be able to service only one read or write at a time. With a single memory, multiple clock cycles can be required, for example, to read input data for each row of the processing engine array 610 before the processing engine array 610 can be started.

In various implementations, the memory subsystem 604 can be configured to simultaneously service multiple clients, including the processing engine array 610, the activation engine 616, the vector engine 617, the pooling engine 618, and any external clients that access the memory subsystem 604 over a chip interconnect 620. In some implementations, being able to service multiple clients can mean that the memory subsystem 604 has at least as many memory banks as there are clients. In some cases, each row of the processing engine array 610 can count as a separate client. In some cases, each column of the processing engine array 610 can output a result, such that each column can count as a separate write client. In some cases, output from the processing engine array 610 can be written into the memory banks 614 that can then subsequently provide input data for the processing engine array 610. As another example, the activation engine 616, the vector engine 617, and the pooling engine 618 can include multiple execution channels, each of which can be separate memory clients. The memory banks 614 can be implemented, for example, using static random access memory (SRAM).

In various implementations, the memory subsystem 604 can include control logic. The control logic can, for example, keep track of the address spaces of each of the memory banks 614, identify memory banks 614 to read from or write to, and/or move data between the memory banks 614. In some implementations, memory banks 614 can be hardwired to particular clients. For example, a set of memory banks 614 can be hardwired to provide values to the rows of the processing engine array 610, with one memory bank servicing each row. As another example, a set of memory banks can be hard wired to receive values from columns of the processing engine array 610, with one memory bank receiving data for each column.

The processing engine array 610 is the computation matrix of the example accelerator 602. The processing engine array 610 can, for example, execute parallel integration, convolution, correlation, and/or matrix multiplication, among other things. The processing engine array 610 includes multiple processing engines 611, arranged in rows and columns, such that results output by one processing engine 611 can be input directly into another processing engine 611. Processing engines 611 that are not on the outside edges of the processing engine array 610 thus can receive data to operate on from other processing engines 611, rather than from the memory subsystem 604.

In various examples, the processing engine array 610 uses systolic execution, in which data arrives at each processing engine 611 from different directions at regular intervals. In some examples, input data can flow into the processing engine array 610 from the left and weight values can be loaded at the top. In some examples weights and input data can flow from the left and partial sums can flow from top to bottom. In these and other examples, a multiply-and-accumulate operation moves through the processing engine array 610 as a diagonal wave front, with data moving to the right and down across the array. Control signals can be input at the left at the same time as weights, and can flow across and down along with the computation.

In various implementations, the number of columns in the processing engine array 610 determines the computational capacity of the processing engine array 610, and the number of rows determines the required memory bandwidth for achieving maximum utilization of the processing engine array 610. The processing engine array 610 can have, for example, 64 columns and 128 rows, or some other number of columns and/or rows.

An example of a processing engine 611 is illustrated in FIG. 6 in an inset diagram. As illustrated by this example, a processing engine 611 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 611.

In the illustrated example, an input from above can include a partial sum, p in, provided either from another processing engine 611 or from a previous round of computation by the processing engine array 610. When starting a computation for a new set of input data, the top row of the processing engine array 610 can receive a fixed value for p in, such as zero. As illustrated by this example, i and w are multiplied together and the result is summed with p in to produce a new partial sum, p out, which can be input into another processing engine 611. Various other implementations of the processing engine 611 are possible.

Outputs from the last row in the processing engine array 610 can be temporarily stored in the results buffer 612. The results can be intermediate results, which can be written to the memory banks 614 to be provided to the processing engine array 610 for additional computation. Alternatively, the results can be final results, which, once written to the memory banks 614 can be read from the memory subsystem 604 over the chip interconnect 620, to be output by the system.

In some implementations, the accelerator 602 includes an activation engine 616. In these implementations, the activation engine 616 can combine the results from the processing engine array 610 into one or more output activations. For example, for a convolutional neural network, convolutions from multiple channels can be summed to produce an output activation for a single channel. In other examples, accumulating results from one or more columns in the processing engine array 610 may be needed to produce an output activation for a single node in the neural network. In some examples, activation engine 616 can be bypassed.

In various examples, the activation engine 616 can include multiple separate execution channels. In these examples, the execution channels can correspond to the columns of the processing engine array 610, and can perform an operation on the outputs of a column, the result of which can be stored in the memory subsystem 604. In these examples, the activation engine 616 may be able to perform between 1 and n parallel computations, where n is equal to the number of columns in the processing engine array 610. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 602 can include a pooling engine 618. Pooling is the combining of outputs of the columns of the processing engine array 610. Combining can include for example, computing a maximum value, a minimum value, an average value, a median value, a summation, a multiplication, or another logical or mathematical combination. In various examples, the pooling engine 618 can include multiple execution channels that can operating on values from corresponding columns of the processing engine array 610. In these examples, the pooling engine 618 may be able to perform between 1 and n parallel computations, where n is equal to the number of columns in the processing engine array 610. In various examples, execution channels of the pooling engine 618 can operate in parallel and/or simultaneously. In some examples, the pooling engine 618 can be bypassed.

In some implementations, the accelerator 602 can further include a vector engine 617. Vector engine 617 is a compute engine that can perform computations and manipulations on values stored in memory subsystem 604 and/or results buffer 612 such as values representing matrices of input values, weight values, intermediate results, etc. Vector engine 617 can include multiple execution channels each with a pipeline of computation circuit blocks (e.g., arithmetic logic units) to perform complex computations such as nested multiply-and-add operations and/or complex manipulations such as sorting operations. In various examples, execution channels of the vector engine 617 can operate in parallel and/or simultaneously. In some examples, the vector engine 617 can be bypassed or be omitted.

Herein, the activation engine 616, the vector engine 617, and the pooling engine 618 may be referred to collectively as execution engines. The processing engine array 610 is another example of an execution engine. Another example of an execution engine is a Direct Memory Access (DMA) engine, which may be located outside the accelerator 602.

Input data 650 can arrive over the chip interconnect 620. The chip interconnect 620 can connect the accelerator 602 to other components of a processor, such as a DMA engine that can obtain input data 650 from an Input/Output (I/O) device, a storage drive, or a network interface. The input data 650 can be, for example one-dimensional data, such as a character string or numerical sequence, or two-dimensional data, such as an array of pixel values for an image or frequency and amplitude values over time for an audio signal. In some examples, the input data 650 can be three-dimensional, as may be the case with, for example, the situational information used by a self-driving car or virtual reality data. In some implementations, the memory subsystem 604 can include a separate buffer for the input data 650. In some implementations, the input data 650 can be stored in the memory banks 614 when the accelerator 602 receives the input data 650.

In some examples, the accelerator 602 can implement a neural network processing engine. In these examples, the accelerator 602, for a set of input data 650, can execute a neural network to perform a task for which the neural network was trained. Executing a neural network on a set of input data can be referred to as inference or performing inference.

The weights for the neural network can be stored in the memory subsystem 604, along with input data 650 on which the neural network will operate. The neural network can also include instructions, which can program the processing engine array 610 to perform various computations on the weights and the input data. The instructions can also be stored in the memory subsystem 604, in the memory banks 614 or in a separate instruction buffer. The processing engine array 610 can output intermediate results, which represent the outputs of individual layers of the neural network. In some cases, the activation engine 616, the vector engine 617, and/or pooling engine 618 may be enabled for computations called for by certain layers of the neural network. The accelerator 602 can store the intermediate results in the memory subsystem 604 for inputting into the processing engine array 610 to compute results for the next layer of the neural network. The processing engine array 610 can further output final results from a last layer of the neural network. The final results can be stored in the memory subsystem 604 and then be copied out to host processor memory or to another location.

Figure 7:
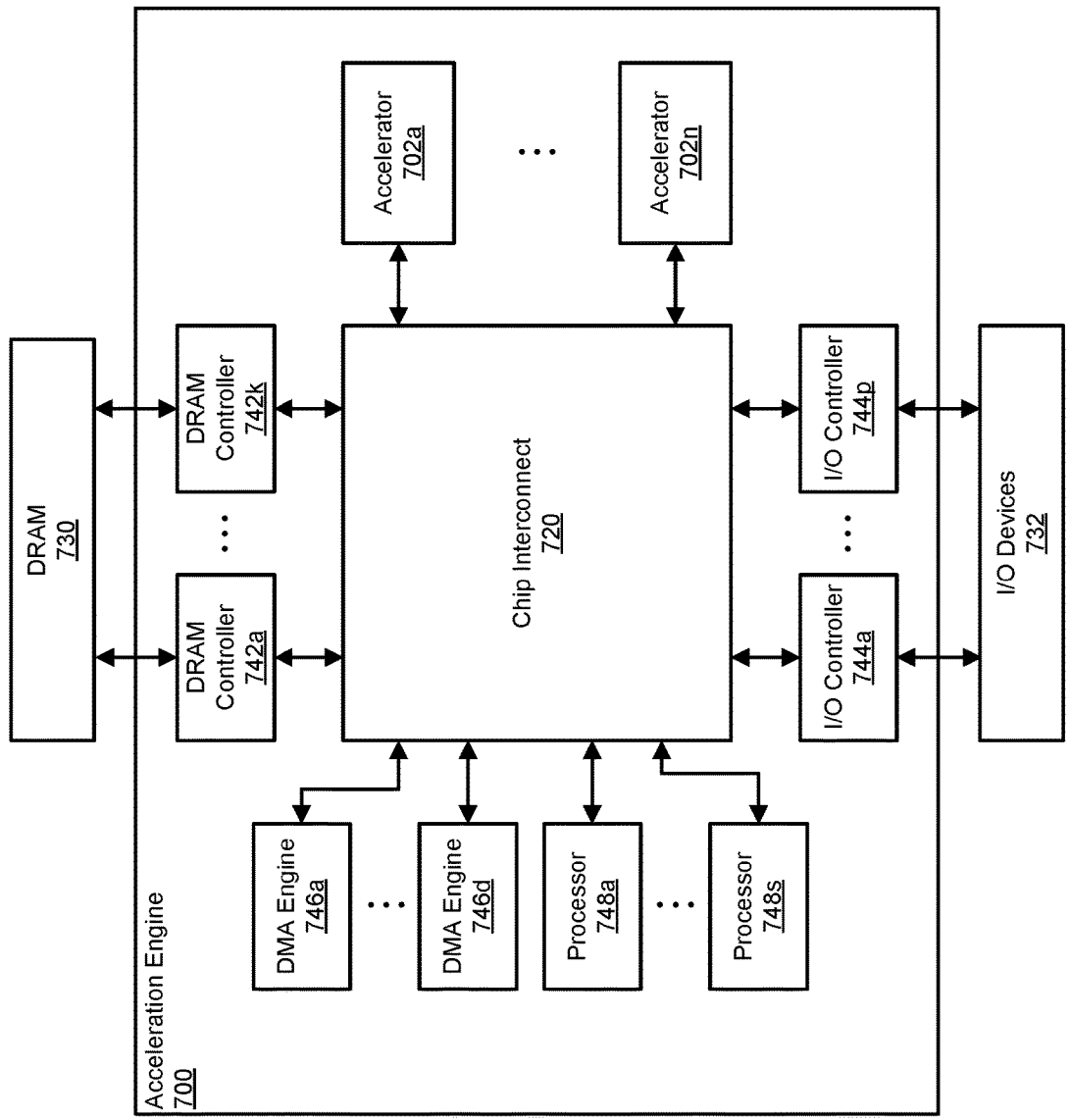
FIG. 7 illustrates a block diagram of an example of an acceleration engine.

FIG. 7 includes a block diagram that illustrates an example of an acceleration engine 700. The acceleration engine 700 is an example of an integrated circuit that can include one or more accelerators 702a-702n that may be similar to the accelerator illustrated in FIG. 6.

In the example of FIG. 7, the acceleration engine 700 includes multiple accelerators 702a-702n, each of which can perform a set of operations. In various examples, the accelerators 702a-702n are for particular types of operations, so that the accelerators 702a-702n can perform the operations much faster than when similar operations are performed by a general-purpose processor. In various examples, to perform a set of operations, input data on which the operations are to be performed must first be moved into the accelerators 702a-702n. Additionally, in some cases, program code is also moved into the accelerators 702a-702n, which programs the operations that the accelerators 702a-702n will perform on the data. In the illustrated example, the acceleration engine 700 includes n accelerators 702a-702n. Examples of accelerators that can be included in the acceleration engine 700 include graphics accelerators, floating point accelerators, neural network accelerators, and others. In various examples, the accelerators 702a-702n can each be the same (e.g., each of the is a graphics accelerator) or can be different (e.g., the accelerators 702a-702n include a graphics accelerator, a floating point accelerator, and neural network accelerator).

The example acceleration engine 700 further includes DRAM controllers 742a-742k for communicating with an external memory. The external memory is implemented, in this example, using DRAM 730. In the illustrated example, the acceleration engine 700 includes k DRAM controllers 742a-742k, each of which may be able to communicate with an independent set of banks of DRAM. In other examples, other types of RAM technology can be used for the external memory. The DRAM controllers 742a-742k can also be referred to as memory controllers.

In various examples, input data and/or program code for the accelerators 702a-702n can be stored in the DRAM 730. Different programs can cause the accelerators 702a-702n to perform different operations. For example, when one of the accelerators is a neural network accelerator, one program can configure the neural network accelerator to perform speech recognition while another program can configure the neural network accelerator to perform image recognition. In various examples, different accelerators 702a-702n can be programmed with different programs, so that each performs a different set of operations. In various examples, the processors 748a-748s can manage moving of program code from the DRAM 730 to the accelerators 702a-702n.

The example acceleration engine 700 further includes I/O controllers 744a-744p for communicating with I/O devices 732 in the system. The acceleration engine 700 can communicate with I/O devices over, for example, a processor bus. In some examples, the processor bus can be implemented using Peripheral Component Interconnect (PCI) and/or a variation of the PCI bus protocol. The processor bus can connect the acceleration engine 700 to I/O devices such as, for example, input and output devices, memory controllers, storage devices, and/or network interface cards, among other things. In some examples, the I/O controllers 744-744p can enable the acceleration engine 700 to act as an I/O device for a host processor. For example, the acceleration engine 700 can be the recipient of input data from the host processor, and a command indicating an operation to be performed on the input data (e.g., a particular computation or analysis). In the illustrated example, the acceleration engine 700 includes p I/O controllers 744a-744p, each of which may include a separate root complex and may communicate with a separate set of I/O devices 732. In other examples, other standardized bus protocols, such as Ultra Path Interconnect (UPI) can be used for the host bus. In other examples, a proprietary bus protocol can be used.

Movement of data in the acceleration engine 700 can be managed by one or more processors 748a-748s, which can also be referred to as data management processors. In the example of FIG. 7, the acceleration engine 700 includes s processors 748a-748s incorporated into the device (e.g., on the same silicon die). In other examples, the processors 748a-748s can be external to the acceleration engine 700 (e.g., on a different die and/or in a different package). In some examples, the processors 748a-748s can manage the movement of data from I/O devices 732 to the accelerators 702a-702n or the DRAM 730. For example, input data may be located at an I/O device 732 or in processor memory, and the processors 748a-748s can move the input from the I/O device 732 or processor memory into an accelerator or into DRAM 730. As another example, program code for the accelerators 702a-702n may be located on an I/O device 732 or in processor memory.

The example acceleration engine 700 further includes DMA engines 746a-746d that can move data between the accelerators 702a-702n, DRAM controllers 742a-742k, and I/O controllers 744a-744p. In the illustrated example, the acceleration engine 700 includes d DMA engines 746a-746d. In some implementations, the DMA engines 746a-746d can be assigned to specific tasks, such as moving data from the DRAM controllers 742a-742d to the accelerators 702a-702n, or moving data between the I/O controllers 744a-744p and the accelerators 702a-702n. These tasks can be assigned, for example, by enqueueing descriptors with the DMA engines 746a-746d, where a descriptor identifies an address for a block of data and an operation (e.g., a read or a write) to perform. A descriptor, for example, can direct a DMA engine to instruct a DMA controller to read a block of data from DRAM 730. A descriptor can, as a further example, instruct the DMA engine to write data, read by the DMA controller, to an accelerator. Further descriptors can be used to move data from an accelerator to DRAM 730.

In various examples, each of the processors 748a-748s can be responsible for managing the data movement for a different accelerator. In some examples, a processor may manage the data movement for more than one accelerator. Similarly, in various examples, each of the processors 748a-748s can be assigned to one or more DMA engines 746a-746d. In these and other examples, associations between processors 748a-748s, accelerators 702a-702n, and DMA engines 746a-746d are determined by program code being executed by each respective processor.

In the example acceleration engine 700, the various components can communicate over a chip interconnect 720. The chip interconnect 720 primarily includes wiring for routing data between the components of the acceleration engine 700. In some cases, the chip interconnect 720 can include a minimal amount of logic, such as multiplexors to control the direction of data, flip-flops for handling clock domain crossings, and timing logic.

Figure 8:
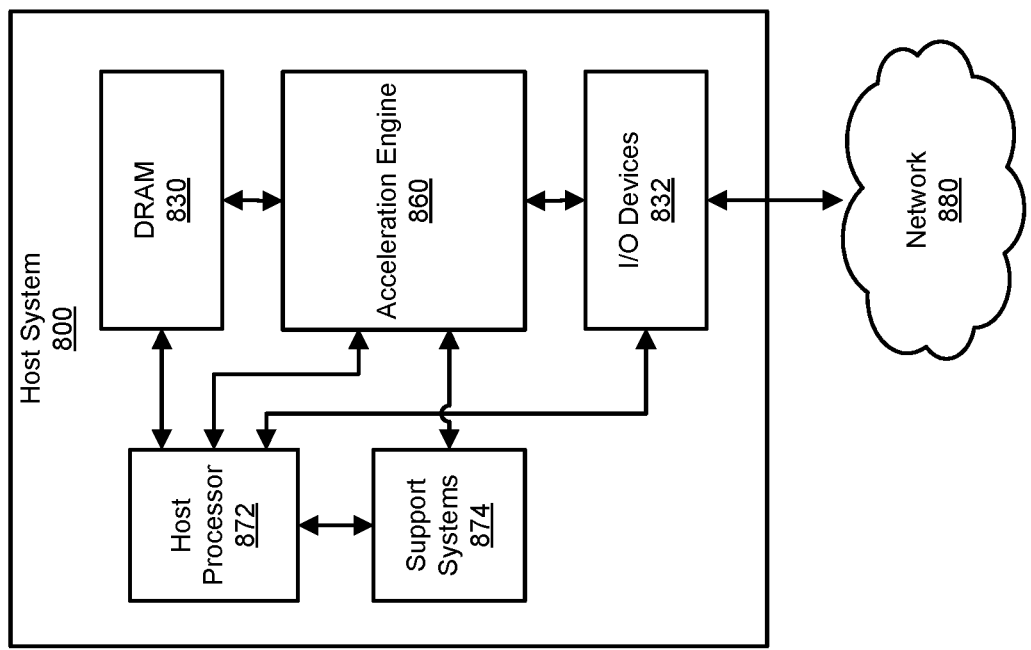
FIG. 8 illustrates a block diagram of an example of a host system.

FIG. 8 includes a block diagram that illustrates an example of a host system 800 in which an acceleration engine 860 can be used. The acceleration engine 860 of FIG. 8 is an example of a device that can include one or more accelerators such as is illustrated in FIG. 7. The example host system 800 of FIG. 8 includes the acceleration engine 860, a host processor 872, DRAM 830 or processor memory, I/O devices 832, and support systems 874. In various implementations, the host system 800 can include other hardware that is not illustrated here.

The host processor 872 is a general-purpose integrated circuit that is capable of executing program instructions. In some examples, the host processor 872 can include multiple processing cores. A multi-core processor may include multiple processing units within the same processor. In some examples, the host system 800 can include more than one host processor 872. In some examples, the host processor 872 and the acceleration engine 860 can be one chip, such as, one or more integrated circuits within the same package.

In various examples, the host processor 872 can communicate with other components in the host system 800 over one or more communication channels. For example, the host system 800 can include a host processor bus, which the host processor 872 can use to communicate with the DRAM 830, for example. As another example, the host system 800 can include an I/O bus, such as a PCI-based bus, over which the host processor 872 can communicate with the acceleration engine 860 and/or the I/O devices 832, for example. In various examples, the host system 800 can, alternatively or additionally, include other communication channels or busses, such as serial busses, power management busses, storage device busses, and so on.

In some examples, software programs executing on the host processor 872 can receive or generate input for processing by the acceleration engine 860. In some examples, the programs can select an appropriate neural network to execute for a given input. For example, a program may be for language translation, and can select one or more neural networks capable of speech recognition and/or machine translation. In these and other examples, the programs can configure the acceleration engine 860 with the neural network to execute, and/or can select a neural network processing engine on the acceleration engine 860 that has previously been configured to execute the desired neural network. In some examples, once the acceleration engine 860 has started an inference on input data, the host processor 872 can manage the movement of data (such as weights, instructions, intermediate results, results of conditional layers, and/or final results) into or out of the acceleration engine 860.

In some examples, a software program that is using the acceleration engine 860 to conduct an inference can read the result from a conditional layer from the acceleration engine 860 and/or from a storage location, such as in DRAM 830. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 830 is memory that is used by the host processor 872 for storage of program code that the host processor 872 is in the process of executing, as well as values that are being operated on. In some examples, the data for a neural network (e.g., weight values, instructions, and other data) can be all or partially stored in the DRAM 830. DRAM is a common term for processor memory, and though DRAM is volatile memory, processor memory can be volatile and/or non-volatile. Though not illustrated here, the host system 800 can include other volatile and non-volatile memories for other purposes. For example, the host system 800 can include a Read-Only Memory (ROM) that stores boot code for booting the host system 800 at power on, and/or Basic Input/Output System (BIOS) code.

Though not illustrated here, the DRAM 830 can store instructions for various programs, which can be loaded into and be executed by the host processor 872. For example, the DRAM 830 can be storing instructions for an operating system, one or more data stores, one or more application programs, one or more drivers, and/or services for implementing the features disclosed herein.

The operating system can manage and orchestrate the overall operation of the host system 800, such as scheduling tasks, executing applications, and/or controller peripheral devices, among other operations. In some examples, a host system 800 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 800. For example, some drivers can provide communication between the operating system and peripheral devices or I/O devices 832. Alternatively or additionally, some drivers may provide communication between application programs and the operating system, and/or application programs and peripheral devices accessible to the host system 800. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 832 can include hardware for connecting to user input and output devices, such as keyboards, mice, pens, tablets, voice input devices, touch input devices, displays or monitors, speakers, and printers, among other devices. The I/O devices 832 can also include storage drives and/or network interfaces for connecting to a network 880. For example, the host system 800 can use a network interface to communicate with storage devices, user terminals, other computing devices or servers, and/or other networks, among various examples.

In various examples, one or more of the I/O devices 832 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 800 or may be in an external enclosure. A storage device can be fixed (e.g., attached by screws) or removable (e.g., having a physical release mechanism and possibly a hot-plug mechanism).

Storage devices, the DRAM 830, and any other memory component in the host system 800 are examples of computer-readable storage media. Computer-readable storage media are physical mediums that are capable of storing data in a format that can be read by a device such as the host processor 872. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 832 can be PCI-based devices. In these examples, a PCI-based I/O device includes a PCI interface for communicating with the host system 800. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 874 can include hardware for coordinating the operations of the acceleration engine 860. For example, the support systems 874 can include a microprocessor that coordinates the activities of the acceleration engine 860, including moving data around on the acceleration engine 860. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 872. In some examples, the program executed by the microprocessor is stored on the hardware of microprocessor, or on a non-volatile memory chip in the host system 800. In some examples, the microprocessor and the acceleration engine 860 can be on chip, such as one integrated circuit on the same die and in the same package.

In some examples, the support systems 874 can be responsible for taking instructions from the host processor 872 when programs executing on the host processor 872 request the execution of a neural network. For example, the host processor 872 can provide the support systems 874 with a set of input data and a task that is to be performed on the set of input data. In this example, the support systems 874 can identify a neural network that can perform the task, and can program the acceleration engine 860 to execute the neural network on the set of input data. In some examples, the support systems 874 only needs to select an appropriate neural network processing engine of the neural network processor. In some examples, the support systems 874 may need to load the data for the neural network onto the acceleration engine 860 before the acceleration engine 860 can start executing the neural network. In these and other examples, the support systems 874 can further receive the output of executing the neural network, and provide the output back to the host processor 872.

In some examples, the operations of the support systems 874 can be handled by the host processor 872. In these examples, the support systems 874 may not be needed and can be omitted from the host system 800.

In various examples, the host system 800 can include a combination of host systems, processor nodes, storage subsystems, and I/O chassis that represent user devices, service provider computers or third-party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks.

Additionally, the user device may be part of the distributed system managed by, controlled by, or otherwise part of the service provider computer (e.g., a console device integrated with the service provider computers).

The host system 800 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method performed by a direct memory access (DMA) engine, comprising:
    processing a first memory descriptor to perform a first DMA write transaction associated with a first set of data;
    processing a second memory descriptor retrieved after retrieval of the first memory descriptor to perform a second DMA write transaction to update a semaphore to indicate that the first set of data has been written, the second memory descriptor having a strong ordered indicator bit enabled to indicate that the second DMA write transaction is a strong ordered transaction that is to be performed after pending DMA write transactions associated with memory descriptors retrieved before retrieval of the second memory descriptor are complete;
    delaying, based on the strong ordered indicator bit being enabled in the second memory descriptor, performance of the second DMA write transaction until the first set of data has been written;
    processing a third memory descriptor retrieved after retrieval of the second memory descriptor to perform a third DMA write transaction to write a second set of data, the third memory descriptor having a strong ordered indicator bit disabled;
    performing the third DMA write transaction to write the second set of data before performing the second DMA write transaction; and
    upon completion of the first DMA write transaction, performing the second DMA write transaction associated with the second memory descriptor to update the semaphore.

2. The computer-implemented method of claim 1, further comprising:
    tracking, based on the strong ordered indicator bit being set in the second memory descriptor, progress of the first DMA write transaction in a scoreboard.

3. The computer-implemented method of claim 2, wherein the scoreboard includes a dependency vector of pending DMA write transactions for each outstanding strong ordered transaction.

4. The computer-implemented method of claim 1, wherein the first DMA write transaction is complete when an acknowledgement for the first DMA write transaction is received.

5. A computer-implemented method comprising:
    retrieving a first memory descriptor in a direct memory access (DMA) engine to perform a strong ordered transaction, wherein the strong ordered transaction is to be performed after completion of pending DMA write transactions associated with memory descriptors retrieved prior to retrieval of the first memory descriptor are complete;
    delaying performance of the strong ordered transaction associated with the first memory descriptor until the pending DMA write transactions associated with the memory descriptors retrieved prior to retrieval of the first memory descriptor are complete;
    allowing subsequent DMA transactions associated with memory descriptors retrieved after retrieval of the first memory descriptor to be issued while waiting for the pending DMA write transactions associated with memory descriptors retrieved prior to retrieval of the first memory descriptor to complete; and
    upon completion of the pending DMA write transactions associated with memory descriptors retrieved prior to retrieval of the first memory descriptor, performing the strong ordered transaction associated with the first memory descriptor.

6. The computer-implemented method of claim 5, further comprising maintaining a scoreboard to track progress of each pending DMA write transaction that the strong ordered transaction is dependent on.

7. The computer-implemented method of claim 6, wherein the scoreboard includes a dependency vector of pending DMA write transactions for each outstanding strong ordered transaction.

8. The computer-implemented method of claim 5, wherein the pending DMA write transactions that the strong ordered transaction waits for include DMA write transactions from multiple write descriptor queues in the DMA engine.

9. The computer-implemented method of claim 5, wherein the first memory descriptor has a strong ordered indicator bit to indicate that the first memory descriptor is for a strong ordered transaction.

10. The computer-implemented method of claim 5, wherein the strong ordered transaction is a strong ordered write transaction.

11. The computer-implemented method of claim 10, wherein the strong ordered write transaction is a write transaction to update a semaphore.

12. The computer-implemented method of claim 10, further comprising:
    retrieving an additional memory descriptor to perform an additional strong ordered transaction while the strong ordered write transaction is still pending;
    delaying the additional strong ordered transaction until each DMA write transaction pending before the additional memory descriptor, including the strong ordered write transaction, are complete; and
    allowing DMA transactions associated with memory descriptors following the additional memory descriptor to be issued while waiting for each DMA write transaction pending before the additional memory descriptor, including the strong ordered write transaction, to complete.

13. The computer-implemented method of claim 5, wherein the strong ordered transaction is a strong ordered read transaction.

14. The computer-implemented method of claim 5, wherein a pending DMA write transaction is complete when an acknowledgement is received in response to the pending DMA write transaction.

15. A direct memory access (DMA) engine comprising:
    one or more descriptor queues operable to store memory descriptors associated with transactions;
    a scoreboard to indicate progress of pending transactions for completion; and
    a controller operable to:
        retrieve, from a descriptor queue of the one or more descriptor queues, a first memory descriptor to perform a strong ordered transaction, wherein the strong ordered transaction is to be performed after pending DMA write transactions associated with memory descriptors retrieved prior to retrieval of the first memory descriptor are complete;
        delay the strong ordered transaction associated with the first memory descriptor until the pending DMA write transactions associated with the memory descriptors retrieved prior to retrieval of the first memory descriptor are complete as indicated by the scoreboard;

allow subsequent DMA transactions associated with memory descriptors retrieved after retrieval of the first memory descriptor to be issued while waiting for the pending DMA write transactions to complete; and upon completion of the pending DMA write transactions associated with the memory descriptors retrieved prior to retrieval of the first memory descriptor, perform the strong ordered transaction associated with the first memory descriptor.

16. The DMA engine of claim 15, wherein the first memory descriptor includes a strong ordered indicator bit to indicate the strong ordered transaction.

17. The DMA engine of claim 15, wherein the pending DMA write transactions belong to more than one descriptor queue.

18. The DMA engine of claim 15, wherein the strong ordered transaction is a strong ordered write transaction.

19. The DMA engine of claim 15, wherein the strong ordered transaction is a strong ordered read transaction.

20. The DMA engine of claim 15, wherein the pending DMA write transactions are associated with writing a tensor into a buffer of a neural network processor.

* * * * *